United States Patent
Futaki et al.

(10) Patent No.: US 10,165,454 B2
(45) Date of Patent: Dec. 25, 2018

(54) RADIO COMMUNICATION SYSTEM, RADIO STATION, NETWORK OPERATION MANAGEMENT APPARATUS, AND NETWORK OPTIMIZATION METHOD

(71) Applicant: NEC Corporation, Tokyo (JP)

(72) Inventors: Hisashi Futaki, Tokyo (JP); Yoshio Ueda, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/385,406

(22) PCT Filed: Mar. 15, 2013

(86) PCT No.: PCT/JP2013/001758
§ 371 (c)(1),
(2) Date: Sep. 15, 2014

(87) PCT Pub. No.: WO2013/136812
PCT Pub. Date: Sep. 19, 2013

(65) Prior Publication Data
US 2015/0044974 A1 Feb. 12, 2015

(30) Foreign Application Priority Data
Mar. 15, 2012 (JP) .................................. 2012-058624

(51) Int. Cl.
*H04W 24/02* (2009.01)
(52) U.S. Cl.
CPC .................................. *H04W 24/02* (2013.01)
(58) Field of Classification Search
CPC ... H04W 24/02; H04W 28/08; H04W 84/045; H04W 72/0486; H04W 88/08;
(Continued)

(56) References Cited

U.S. PATENT DOCUMENTS 8,983,453 B1 * 3/2015 On ........................ H04W 24/02
370/252
9,258,719 B2 * 2/2016 Tarraf .................... H04W 24/02
(Continued)

FOREIGN PATENT DOCUMENTS

WO WO 2009/115554 * 9/2009
WO WO 2009/115554 A1 9/2009
(Continued)

OTHER PUBLICATIONS

NEC, "Load Balancing Signalling and Associated SON", 3GPP TSG-RAN WG2#61 R2-081175, Feb. 11-15, 2008, URL: htpp:/www.3gpp.org/ftp/tsg ran/WG2 RL2/TSGR2 61/doc/R2-081175.zip.*
(Continued)

*Primary Examiner* — Nay A Maung
*Assistant Examiner* — Angelica M Perez
(74) *Attorney, Agent, or Firm* — Finnegan, Henderson, Farbow, Garrett & Dunner, L.L.P.

(57) ABSTRACT

A radio communication system, a radio station, a network operation management apparatus, and a network optimization method are provided that can optimize a performance of the entire system even when network optimization is performed individually. In the radio communication system including multiple radio stations (10, 20, 30) and network operation management apparatuses managing the radio stations, network optimization is autonomously performed. A first radio station (10) notifies first optimization information regarding network optimization in a cell (10a) of the first radio station to at least one of another second radio station (20/30) that is different from the first radio station and a network apparatus that manages the second radio station (101).

24 Claims, 12 Drawing Sheets

(58) Field of Classification Search
CPC ......... H04W 36/0083; H04W 52/0206; H04W 28/0289; H04W 36/00
USPC .......................................... 455/453, 524, 500
See application file for complete search history.

(56) References Cited

U.S. PATENT DOCUMENTS

| | | | |
|---|---|---|---|
| 9,380,639 B2* | 6/2016 | On | H04W 84/18 |
| 9,485,704 B2* | 11/2016 | Frenger | H04W 36/38 |
| 2012/0028584 A1* | 2/2012 | Zhang | H04W 16/14 |
| | | | 455/63.1 |
| 2013/0007275 A1* | 1/2013 | Li et al. | 709/224 |

FOREIGN PATENT DOCUMENTS

| | | |
|---|---|---|
| WO | WO 2011/046150 A1 | 4/2011 |
| WO | WO 2011/144251 A1 | 11/2011 |
| WO | WO 2011/149085 A1 | 12/2011 |
| WO | WO 2012/000551 A1 | 1/2012 |

OTHER PUBLICATIONS

Description of Energy Saving Mechanisms, 3GPP TSG-RAN3 Metting #71, R2-105252, URL: http:/www.3gpp.org/ftp/tsg ran/ WG2 RL2/TSGR2 61/Docs/R2-105252.zip, Feb. 2008.*

3GPP TR 36.902 V9.3.0, $3^{rd}$ Generation Partnership Project, "Self-configuring and self-optimizing network (SON) use cases and solutions", (Internet <URL> http:www.3gpp.org/ftp/Specs/html-info/36902.htm), Release 9, Dec. 2010.

3GPP TS 36.300 V10.5.0, Section 22 (Internet <URL> http:www.3gpp.org/ftp/Specs/html-info/36300.htm), Release 10, Sep. 2011.

Description of Energy Saving mechanisms, [online], 3GPP TSG-RAN3 Meeting #71, R2-105252, retrieved from the Internet: <URL: http://www.3gpp.org/ftp/tsg_ran/WG2_RL2/TSGR2_71/Docs/R2-105242.zip> Aug. 2010.

NEC, "Load Balancing Signalling and associated SON", [online], 3GPP TSG-RAN WG2#61 R2-081175, retrieved from the Internet: URL:http:/www.3gpp.org/ftp/tsg_ran/WG2_RL2/TSGR2_61/Docs/ R2-081175.zip, Feb. 2008.

International Search Report and Written Opinion dated May 28, 2013 in corresponding PCT International Application.

Extended European Search Report dated Dec. 11, 2015 by the European Patent Office in counterpart European Patent Application No. 13760935.0.

3rd Generation Partnership Project; Technical Specification Group Radio Access Network; Evolved Universal Terrestrial Radio Access Network (E-UTRAN); Self-configuring and self-optimizing network (SON) use cases and solutions (Release 9), 3GPP TR36.902, 3GPP, V9.3.1, (2011).

Japanese Office Action dated Mar. 1, 2017 by the Japanese Patent Office in counterpart Japanese Patent Application No. 2014-504715.

* cited by examiner

SECOND EXAMPLE

FOURTH EXAMPLE

RADIO COMMUNICATION SYSTEM, RADIO STATION, NETWORK OPERATION MANAGEMENT APPARATUS, AND NETWORK OPTIMIZATION METHOD

CROSS-REFERENCE TO RELATED PATENT APPLICATIONS

This application is a National Stage Entry of International Application No. PCT/JP2013/001758, filed Mar. 15, 2013, which claims priority from Japanese Patent Application No. 2012-058624, filed Mar. 15, 2012. The entire contents of the above-referenced applications are expressly incorporated herein by reference.

TECHNICAL FIELD

The present invention relates to a radio communication system and, more particularly, to a radio station, a network operation management apparatus and a radio communication system that have a function of performing network optimization, as well as to a network optimization method.

BACKGROUND ART

In recent years, active discussions have been conducted about SON (Self Organizing Network), which autonomously optimizes a radio parameter and/or network configuration in a radio communication system such as a cellular system, in the light of operation cost (OPEX) reduction. The standardization of SON functions is also under way in 3GPP LTE (Long Term Evolution) (NPL 1).

SON has functions such as the following:
Self-Configuration;
Self-Optimization; and
Self-Healing.

These are technologies for achieving respective different purposes. Of these functions, types of self-optimization include: optimization of cell coverage and capacity (Coverage and Capacity Optimization (CCO)); optimization of a handover parameter (Mobility Robustness Optimization (MRO)); optimization of load balancing (Mobility Load Balancing (MLB)); and the like (NPL 2).

Hereinafter, the self-optimization function will be described briefly by taking a 3GPP LTE radio communication system as an example. Note that a radio base station (enhanced Node B) will be abbreviated to eNB.

As shown in FIG. 1, it is assumed that there exist macro eNBs (MeNBs) 1 and 2, which manage macro cells 1$a$ and 2$a$, respectively, and a pico eNB (PeNB) 3, which manages a pico cell 3$a$, and that the MeNBs 1 and 2 are provided by a vendor A while the PeNB 3 is provided by a vendor B. It is further assumed that the MeNBs 1 and 2 are managed by a SON server A of the vendor A while the PeNB 3 is managed by a SON server B of the vendor B. It is each eNB, or a SON server managing it, to execute a self-optimization algorithm and determine various parameters in accordance with a purpose of the self-optimization.

For example, when the SON server A performs handover parameter optimization (MRO) for a handover between the macro cells 1 and 2, this handover parameter is determined, with consideration given to the statistics of a handover performance (e.g., handover failure rate or the number of handover failures) from the macro cell 1 to the macro cell 2 (and vice versa) or the like. Thus, the handover performance between these macro cells is improved.

On the other hand, when the SON server B performs load balancing optimization (MLB) in the pico cell 3$a$ independently of the execution of MRO by the SON server A, the SON server B determines a parameter for a handover from the pico cell 3$a$ to a neighbour cell, with consideration given to, for example, the loaded state of the pico cell 3$a$ (e.g., traffic volume, hardware utilization of the PeNB) or the like. Thus, it is possible to prevent load from concentrating on the pico cell 3$a$, or to enhance the effects of off-loading to the pico cell 3$a$ to improve a performance of the entire system (e.g., system throughput).

As described above, a network autonomously performs optimization, whereby it is possible to reduce the cost for an operator's manual adjustment of radio parameter and/or network parameter (OPEX).

CITATION LIST

Patent Literature

[NPL 1]
3GPP TS36.300 v10.5.0, Section 22 (Internet <URL> http://www.3gpp.org/ftp/Specs/html-info/36300.htm)
[NPL 2]
3GPP TR36.902 v9.3.0 (Internet <URL> http://www.3gpp.org/ftp/Specs/html-info/36902.htm)

SUMMARY OF INVENTION

Technical Problem

However, according to the network self-optimization technologies as described above, optimization is performed in a cell (and between relevant cells) managed by a SON server, which, at that time, does not particularly consider the states of cells outside its management. Accordingly, no consideration is given to how optimization performed by some SON server affects other cells. This is noticeable when venders are different.

For example, it is assumed that the SON server A of the vendor A performs handover parameter optimization (MRO) for a handover from the macro cell 1$a$ to the pico cell 3$a$ of the vendor B while the SON server B of the vendor B performs load balancing optimization (MLB) in the pico cell 3$a$. For example, the SON server A determines an update of a handover parameter based on this statistics of handover performance so as to prompt a handover from the macro cell 1$a$ to the pico cell 3$a$. The SON server B, oppositely, determines an update of a handover parameter based on the loaded state of the pico cell 3$a$ so as to prompt a handover from the pico cell 3$a$ to the macro cell 1$a$ to thereby reduce load on the pico cell 3$a$. That is, it occurs that each vendor's SON server determines to perform a control that is exactly opposite to the other one's, on the same cell pair (the macro cell 1$a$ and pico cell 3$a$). As a result, an inconsistency in optimization policies occurs between the vendors, resulting in a situation where neither the self-optimization of a handover parameter in the macro cell 1$a$ nor the self-optimization of a handover parameter in the pico cell 3$a$ achieves expected effects. That is, optimization from the viewpoint of a system performance cannot be achieved.

Accordingly, an object of the present invention is to provide a radio communication system, a radio station, a network operation management apparatus, and a network optimization method that can optimize a performance of the entire system even when network optimization is performed individually.

Solution to Problem

A radio communication system according to the present invention is a radio communication system which includes multiple radio stations and network operation management apparatuses managing the radio stations and in which network optimization is performed, characterized in that a first radio station notifies first optimization information regarding network optimization in a cell of the first radio station to at least one of a second radio station that is different from the first radio station and a network operation management apparatus that manages the second radio station.

A radio station according to the present invention is a radio station in a radio communication system which includes multiple radio stations and network operation management apparatuses managing the radio stations and in which network optimization is performed, characterized by comprising: an optimization means for executing network optimization in a cell of its own radio station; and a notification control means for notifying optimization information regarding the network optimization to at least one of another radio station and a network operation management apparatus managing the another radio station.

Moreover, a radio station according to the present invention is a radio station in a radio communication system which includes multiple radio stations and network operation management apparatuses managing the radio stations and in which network optimization is performed, characterized by comprising: a communication means for receiving from another radio station that is different from its own radio station optimization information regarding network optimization in a cell of the another radio station; and an optimization control means for performing network optimization in a cell of its own radio station.

A network operation management apparatus according to the present invention is a network operation management apparatus in a radio communication system which includes multiple radio stations and in which network optimization is performed, characterized by comprising: a network supervision means for receiving from a first radio station first optimization information regarding network optimization in a cell of the first radio station; a communication control means for communicating the first optimization information to a second radio station that is different from the first radio station or another network operation management apparatus; and an optimization control means for performing the network optimization at the first radio station or the second radio station.

A network optimization method according to the present invention is a network optimization method in a radio communication system which includes multiple radio stations and network operation management apparatuses managing the radio stations and in which network optimization is performed, characterized in that a first radio station notifies first optimization information regarding network optimization in a cell of the first radio station to at least one of a second radio station that is different from the first radio station and a network operation management apparatus that manages the second radio station.

Advantageous Effects of Invention

According to the present invention, it is possible to optimize performance of an entire system even when network optimization is performed individually.

DESCRIPTION OF EMBODIMENTS

1. Outline of Exemplary Embodiments of the Present Invention

According to exemplary embodiments of the present invention, a radio communication system includes multiple radio stations managed by network operation management apparatuses and performs network optimization, in which a radio station notifies another radio station of optimization information, which is information related to network optimization in a cell of this radio station (i.e., a cell managed by the radio station). Thus, between radio stations, one can obtain knowledge of optimization information on the other, whereby it is possible to avoid performance degradation in the entire system, which may occur when network optimization is performed individually. Hereinafter, a schematic architecture of the present invention will be described.

Figure 1:
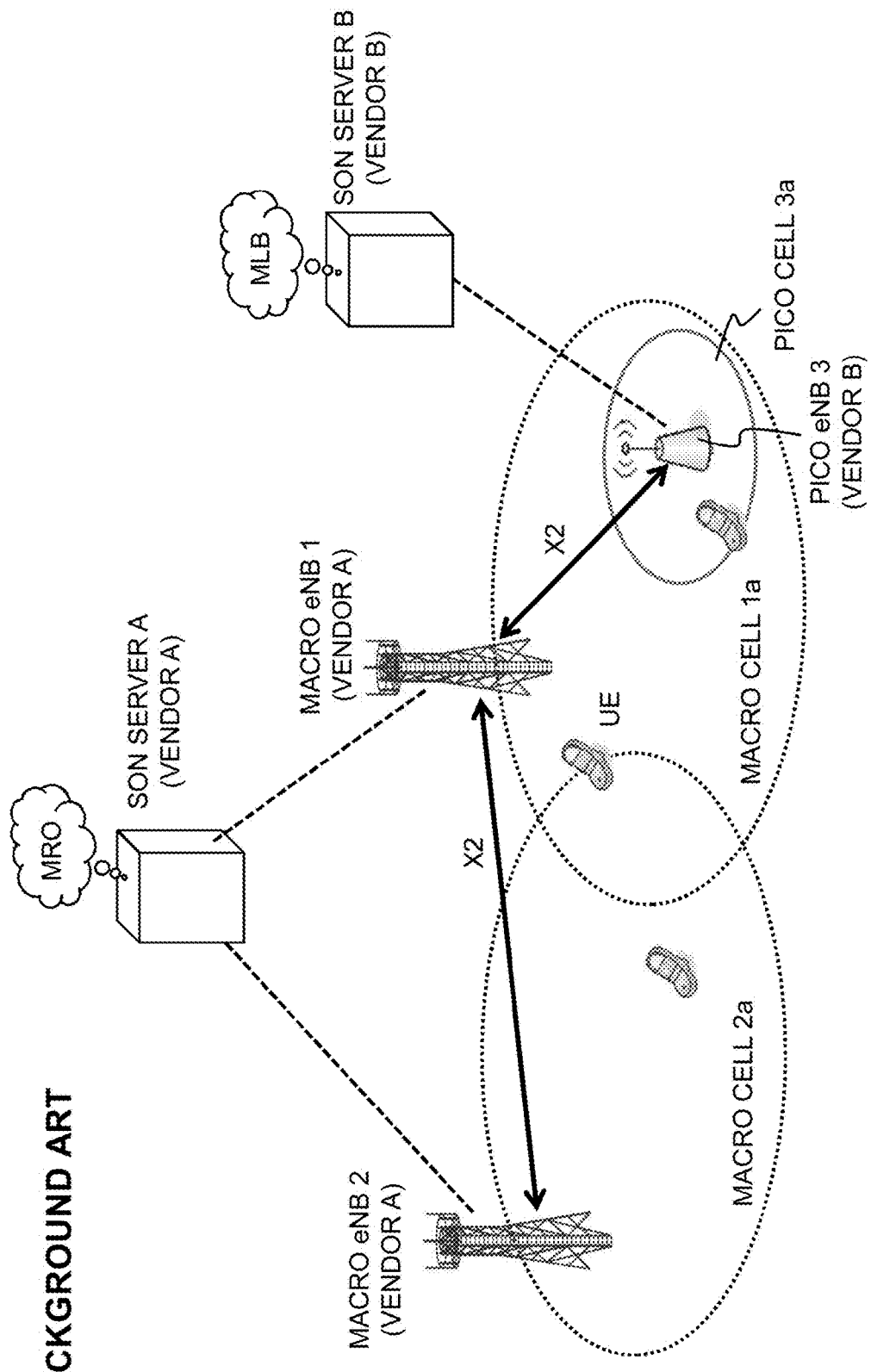
FIG. 1 is a system architecture diagram for explaining self-optimization operation in an existing radio communication system.
Figure 2:
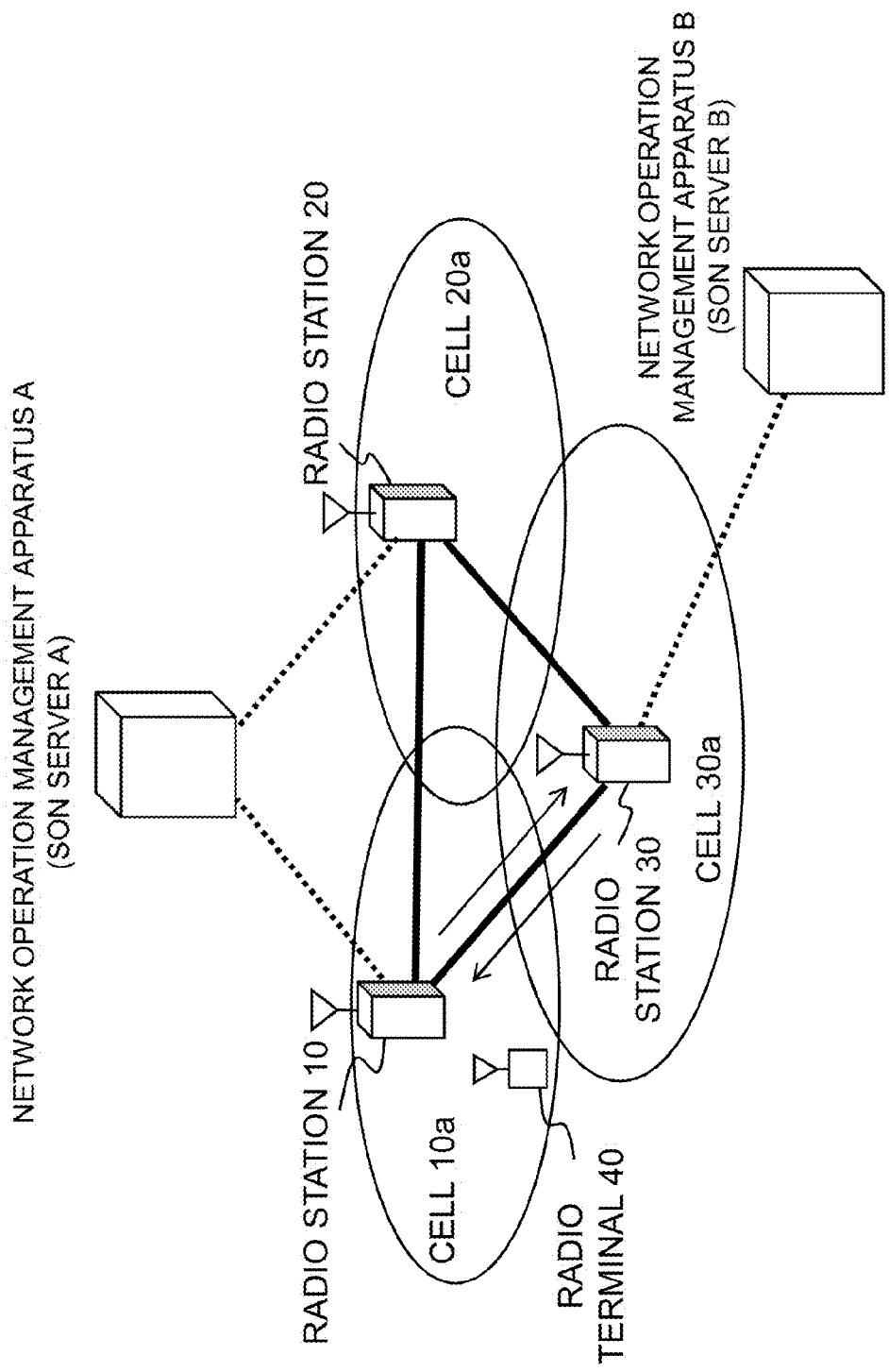
FIG. 2 is a system architecture diagram for explaining an outline of a radio communication system according to the present invention.

As illustrated in FIG. 2, a radio communication system is assumed to include radio stations 10, 20 and 30, which manage cells 10*a*, 20*a* and 30*a*, respectively, a network operation management apparatus A (SON server A), which controls or manages the radio stations 10 and 20, and a network operation management apparatus B (SON server B), which controls or manages the radio station 30. It is not necessary for the cells 10a, 20a and 30a to be in contact with each other at the edges, but it is sufficient for them to be deployed as closely as they exert effects on each other.

Each of the radio stations in FIG. 2 may include not only a radio base station directly controlling a cell, but also a upper level network apparatus controlling or managing multiple radio base stations (and hence multiples cells). It is conceivable that a radio station is, for example, a radio base station, a base station controller, a network apparatus such as a core network, or the like. Moreover, a network operation management apparatus is also referred to as a SON server or an O&M (Operation and Management) server. Further, apart from them, it is also possible that a upper level network apparatus is provided, via which the radio stations are communicably connected to each other. It is also possible to directly connect the radio stations to each other through a higher-speed interface. Here, "higher-speed" means that the interface may be a physically higher-speed circuit than other interfaces, or may produce shorter delay because of simple processing, shorter communication interval, or the like. A radio station notifies information related to network optimization through the interface between radio stations, resulting in the enhanced effect of avoiding system performance degradation due to a network self-optimization in comparison with notification via a upper level network apparatus. When system performance degradation occurs due to a network self-optimization, the longer time is taken to notify information, the further the performance degradation proceeds. Accordingly, a radio station notifies information through a high-speed interface between radio stations, whereby the greater effect of avoiding performance degradation can be obtained.

Figure 3:
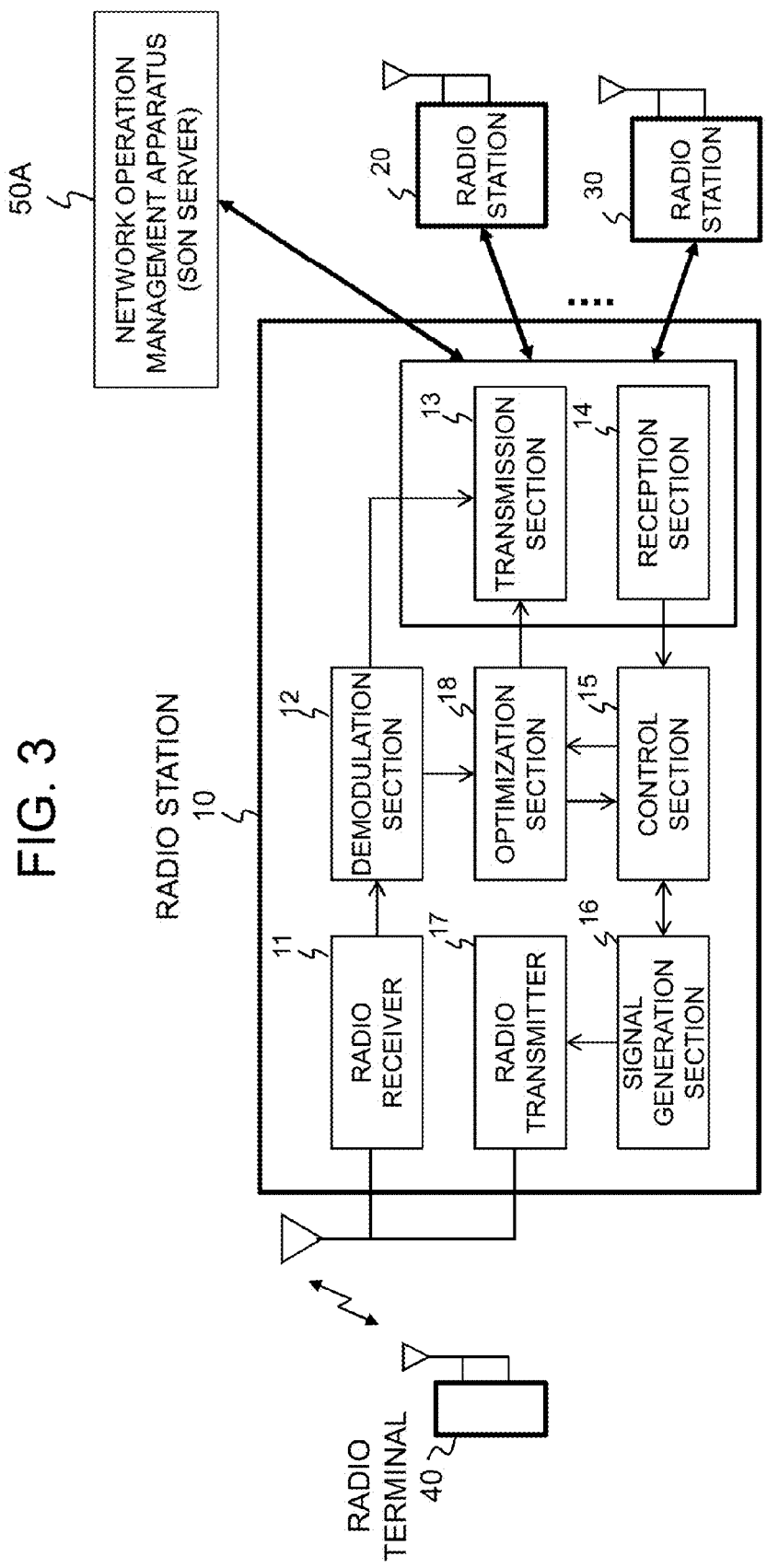
FIG. 3 is a block diagram showing a functional configuration of a radio station to which network optimization methods according to examples of the present invention are applied.

Referring to FIG. 3, the radio station 10, includes: a radio receiver 11 that receives a radio signal from a radio terminal 40; a demodulation section 12 that demodulates a received signal; a transmission section 13 that transmits demodulated information or control information to a upper level network or another radio station; a reception section 14 that receives a signal from an upper level network or another radio station; a control section 15 that performs control based on a signal received from a upper level network; a signal generation section 16 that generates a transmission signal based on data or control information to transmit to the radio terminal 40; and a radio transmitter 17 that transmits a radio signal to the radio terminal 40. Further, an optimization section 18 optimizes radio parameter and/or network parameter based on a demodulation result of a signal received from a radio terminal (e.g., measurement information) and statistical communication quality (KPI), and notifies optimization information on its own station to another radio station. Note that the radio stations 20 and 30 have basically the same functional configurations. Additionally, the control section 15 and the optimization section 18 may be a program-controlled processor such as a CPU (Central Processing Unit) that implements various functions by using software.

Figure 4:
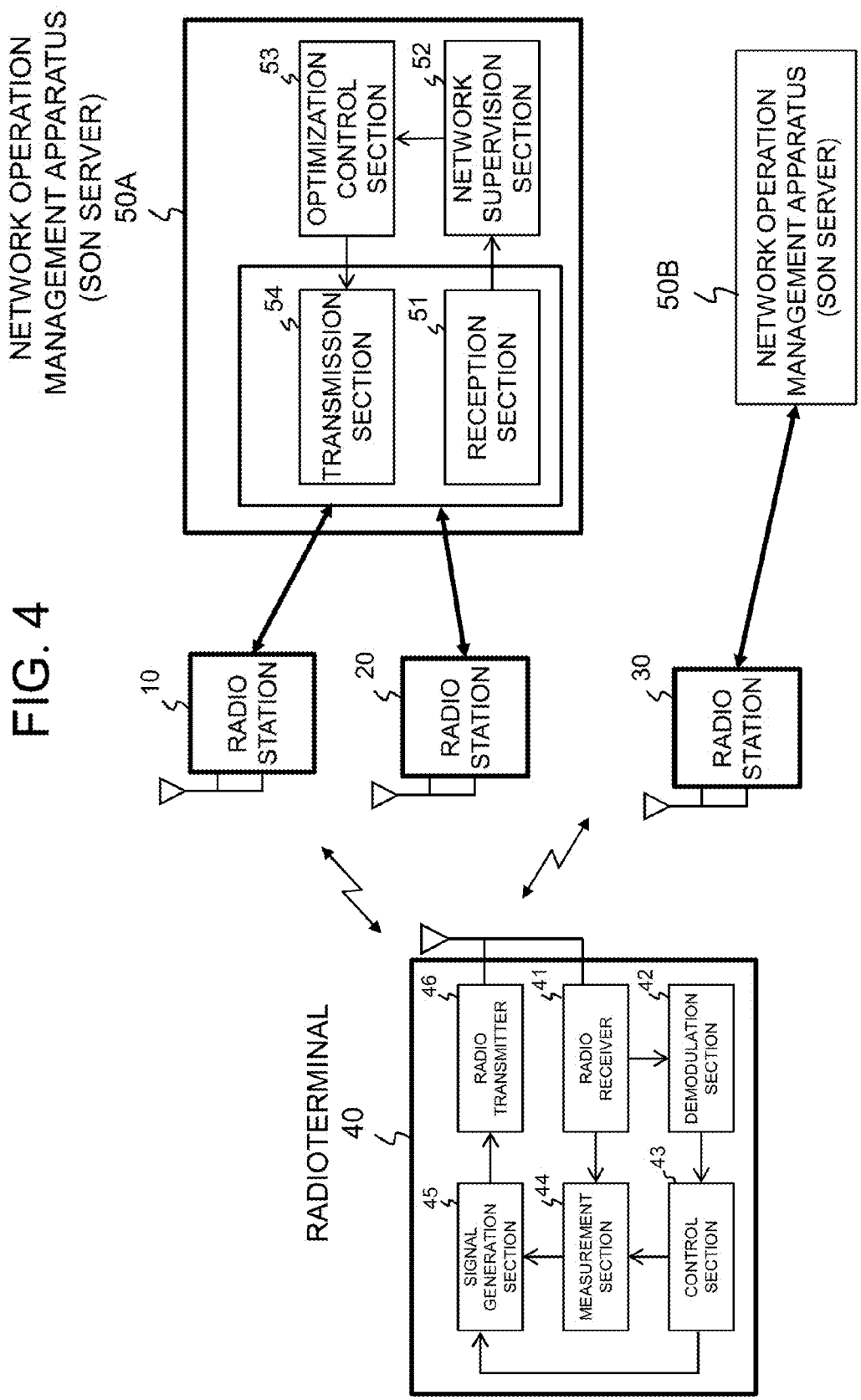
FIG. 4 is a block diagram showing a functional configuration of a network operation management apparatus to which the network optimization methods according to the examples of the present invention are applied.

Referring to FIG. 4, the network operation management apparatus (SON server) 50A includes: a reception section 51 that receives a signal from a radio station or a upper level network; a network supervision section 52 that stores information included in a received signal (e.g., network measurement information, which is a measurement result of service quality by a radio station or service quality related information) and calculates statistical communication quality (KPI); an optimization control section 53 that optimizes radio parameter and/or network parameter at a radio station based on the network measurement information and KPI information; and a transmission section 54 that transmits a signal such as an instruction for optimization to a radio station or a upper level network. Note that the other network operation management apparatus (SON server) 50B has a similar functional configuration.

Moreover, the radio terminal 40 includes: a radio receiver 41 that receives a radio signal from a radio station (e.g., a radio base station); a demodulation section 42 that demodulates the radio signal; a control section 43 that performs control based on a result of demodulation; a measurement section 44 that measures a received signal; a signal generation section 45 that generates a signal based on data or control information; and a radio transmitter 46 that transmits a signal to a radio station. Note that the configurations shown in FIGS. 3 and 4 are for the purpose of illustration rather than limitation. Hereinafter, exemplary embodiments and examples of the present invention will be described in detail with reference to drawings.

2. Exemplary Embodiments 2.1) First Exemplary Embodiment

Figure 5:
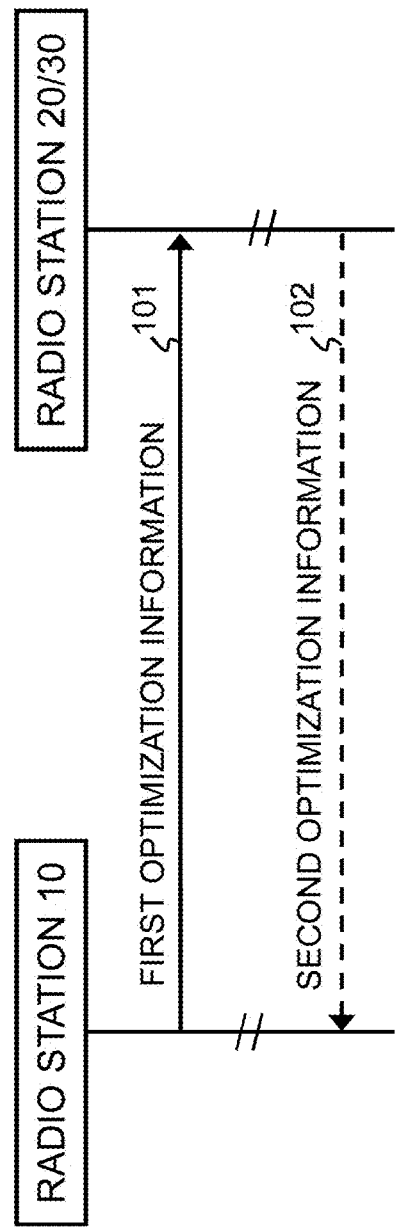
FIG. 5 is a sequence diagram showing an example of operations in a radio communication system according to a first exemplary embodiment of the present invention.

Referring to FIG. 5, according to a first exemplary embodiment of the present invention, the radio station 10 notifies information related to network optimization in the cell 10a of the radio station 10 (first optimization information) to both or one of the other radio stations 20 and 30 (Operation 101). Thus, the optimization sections 18 of the radio stations 20 and 30 can obtain knowledge of the optimization information on the radio station 10 (first optimization information), whereby it is possible to avoid performance degradation in the entire system when network self-optimization is performed individually. Similarly, another radio station 20 or 30 may notify information related to network optimization in the cell 20a or 30a of this radio station (second optimization information) to the radio station 10 (Operation 102).

2.2.) Second Exemplary Embodiment

Figure 6:
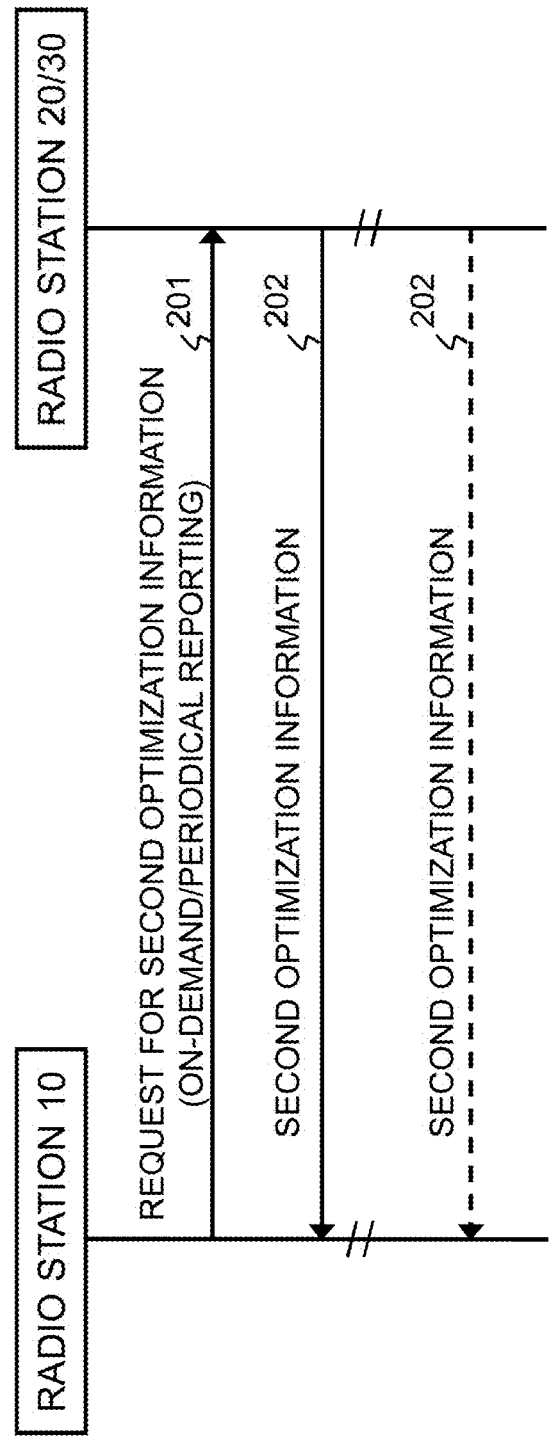
FIG. 6 is a sequence diagram showing an example of operations in a radio communication system according to a second exemplary embodiment of the present invention.

Referring to FIG. 6, according to a second exemplary embodiment of the present invention, the radio station 10 requests information related to network optimization in both or one of the cells of the other radio stations 20 and 30 (e.g., the cell 20a and/or the cell 30a) (second optimization information) from the radio station 20 and/or the radio station 30 (Operation 201). In response to this, both or one of the other radio stations 30 and 20 notify the second optimization information to the radio station 10 (Operation 202). The optimization section 18 of the radio station 10 that has received the second optimization information performs network optimization in the cell 10a based on the second optimization information. Note that the request for the second optimization information in Operation 201 may be an on-demand request (i.e., notification is made upon each request), or may be a request for periodically reporting (i.e., multiple notifications are made periodically in response to a request at a certain point of time).

2.3.) Third Exemplary Embodiment

Figure 7:
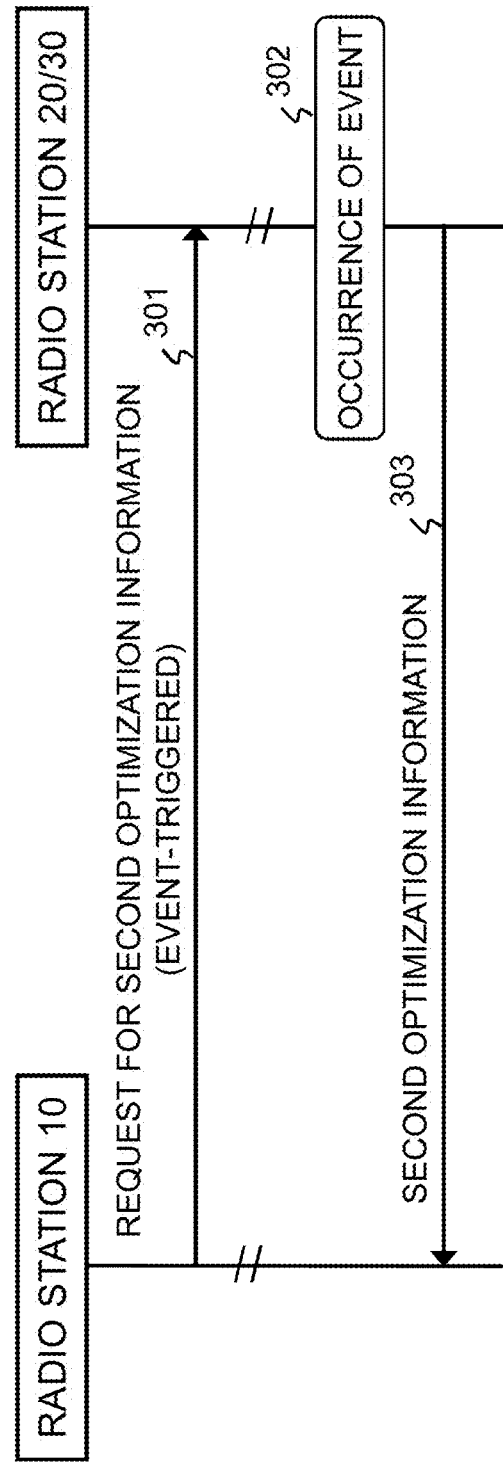
FIG. 7 is a sequence diagram showing an example of operations in a radio communication system according to a third exemplary embodiment of the present invention.

Referring to FIG. 7, according to a third exemplary embodiment of the present invention, the radio station 10 requests both or one of the other radio stations 20 and 30 to notify second optimization information when being triggered by an event (Operation 301). In response to this request, the other radio station(s), when or after the predetermined event occurs (Operation 302), notifies the second optimization information on itself/themselves to the radio station 10 (Operation 303). The event may be predefined, or may be notified (that is, indicated) by the radio station 10. Further, notification may be made periodically at predetermined intervals after the event occurs.

2.4) Other Embodiments

It is also possible that when the radio station 10 receives second optimization information from another radio station 20 or 30, the radio station 10 notifies the received second optimization information or the like to the network operation management apparatus (SON server) 50A that manages the radio station 10. The network operation management apparatus (SON server) 50A, based on the received second optimization information or the like, executes a network optimization algorithm to determine radio parameter and/or network parameter and returns these parameters to the radio station 10. The radio station 10 may also perform network optimization by using the parameters received from the network operation management apparatus (SON server) 50A. Further, it is also possible that a network operation management apparatus is configured to generate first or second optimization information, and that the first optimization information and/or second optimization information is notified between a radio station and the network operation management apparatus, or between network operation management apparatuses.

3. Optimization Information

3.1) Execution Status Indicated by Optimization Information

The optimization information mentioned above may also indicate the execution status of network optimization. Conceivable execution status includes, for example, "to be executed", "under execution" and "execution completed".

"To be executed" indicates that a type (function) of network optimization that a radio station or network operation management apparatus (SON server) has is possibly executed.

"Under execution" indicates that optimization is being executed (in other words, radio parameter and/or network parameter are being changed) by a radio station or network operation management apparatus (SON server), or that an optimization algorithm is being executed (in other words, it is being determined whether or not to change radio parameter and/or network parameter, or the amount of a change is being calculated).

"Execution completed" indicates that a radio station or network operation management apparatus (SON server) has completed optimization (in other words, changing of radio parameter and/or network parameter and execution of an optimization algorism have completed), or that radio parameter and/or network parameter have been updated (e.g., changing of radio parameter and/or network parameter has completed, while an optimization algorithm is continually being executed).

3.2) Details of Optimization Information

The optimization information includes:
a) information related to type of network optimization;
b) information related to purpose of network optimization;
c) information related to control policy in network optimization;
d) radio parameter and/or network parameter to be targeted for optimization;
e) information related to execution timing of network optimization;
f) location information of a radio station; or the like.

For a) "information related to type of network optimization", conceivable ones include, but are not limited to, for example:
coverage optimization;
capacity optimization;
coverage and/or capacity optimization;
handover optimization;
load balancing optimization;
cell outage compensation;
energy saving management;
neighbour cell list optimization;
inter-cell interference reduction; and the like.

In b) "information related to purpose of network optimization", information specifying what the optimization is intended for is included, such as, for example:
handover optimization for a specific neighbour cell;
handover optimization for multiple neighbour cells;
off-loading to a neighbour cell
off-loading from a neighbour cell;
coverage maximization;
coverage extension;
coverage shrink;
dead spot elimination;
Inter-Cell Interference Coordination (ICIC); or
Fractional Frequency Reuse (FFR).

Here, the concept of "neighbour cells" is not only cells that are physically in contact with each other but also includes cells existing in their own neighborhood. Moreover, to achieve coverage extension/shrink, a conceivable method is to increase or decrease the power to transmit a known signal (also referred to as a reference signal), or to decrease or increase the tilt angle of a transmission antenna. To achieve elimination of dead spot (an area where received quality is lower than a predetermined value or communication is out of reach; also referred to as out of service area), a conceivable method is to extend the coverage of a neighbour cell on a cell where cell outage is detected, to promote a handover to a neighbour cell, or the like. Note that the identifier of a target cell (a cell ID) may be also added to an item of the information related to purpose of network optimization described above.

In c) "information related to control policy in network optimization", a time condition for control is included, such as, for example:
optimization at long intervals;
optimization at short intervals; or
optimization triggered by the fact that a predetermined condition is met.

Here, conceivable predetermined conditions include, for example: statistical communication quality (KPI) having degraded (or changed) by a predetermined amount (or a predetermined percentage); optimization information regarding network optimization having been received from another radio station; and the like.

Further, the "information related to control policy in network optimization" may also include a condition that should be considered when control is performed, such as:
order of priorities among multiple types of network optimization;
priority of each type of network optimization;

importance of each type of network optimization; or optimization mode.

Here, for example, the order of priorities may be explicitly indicated along with the types of network optimization, or the types of network optimization may be indicated in accordance with such order of priorities (i.e., in descending or ascending order of priorities). Moreover, the optimization modes are discriminated based on whether or not a decision of an operator (i.e., a policy of an operator) made in optimization control is reflected. An optimization mode is information indicating either an "open mode (also referred to as an open loop)", in which an operator makes a (final) decision in each optimization control or an optimization control at a predetermined timing, or a "closed mode (also referred to as a closed loop)", in which an operator does not make a decision. For example, if radio stations that have exchanged optimization information are both in the open mode, a conceivable scenario is that since their operators make decisions, it is determined that optimization control can keep independent of each other. Alternatively, when one of radio stations notifies its open mode while the other radio station notifies its closed mode, it may be determined that optimization control on the open mode side has priority, in order to give priority to a decision of the operator. Oppositely, it may be determined that optimization control on the closed mode side is continued, in the expectation that a problem can be quickly found in the open mode because the operator intervenes.

For d) "radio parameter and/or network parameter to be targeted for optimization", conceivable parameters include, but are not limited to, for example:

transmit power of a radio station;
angle of antenna (tilt or azimuth) of a radio station;
number of antennas actually transmitting/receiving signals at a radio station;
handover-related parameter;
cell (re-)selection-related parameter;
neighbour cell list;
common channel transmission parameter;
shared channel transmission parameter;
control channel transmission parameter;
cell on/off switching; and the like.

For e) "information related to execution timing of network optimization", conceivable ones include, but are not limited to, for example:

execution time when network optimization was performed;
scheduled execution time when network optimization will be performed;
information indicating a timing of performing network optimization;
interval of network optimization; and the like.

4. Effects

As described above, optimization information is exchanged between radio stations that manage cells adjacent to each other, respectively, between a radio station and a network operation management apparatus (a SON server), or between network operation management apparatuses (SON servers), whereby network optimization, that is, optimization of radio parameters and/or network parameters can be performed in their own cells, with consideration given to the status of network optimization in a neighbour cell.

For example, suppose a situation as follows in the system shown in FIG. 2. Specifically, the SON server A intends to optimize a handover from the cell 10a to the cell 30a to reduce the rate of handover failures from the cell 10a to the cell 30a, while the SON server B intends to perform off-loading from the cell 30a to the cell 10a to reduce load on the cell 30a. At this time, according to the above-described exemplary embodiments, optimization information is exchanged between the radio stations 10 and 30. Accordingly, the SON server B can recognize that the SON server A is intending to optimize a handover from the cell 10a to the cell 30a, while the SON server A can recognize that the SON server B is intending to perform off-loading from the cell 30a to the cell 10a.

Since the status of optimization in the neighbour cell is mutually recognized, the SON server B, in accordance with a predefined rule (e.g., a rule that priority is given to handover optimization, or the like), can take an appropriate action, such as waiting to perform off-loading from the cell 30a to the cell 10a until the SON server A completes handover optimization. As a result, it is possible to reduce the rate of handover failures from the cell 10a to the cell 30a. On the other hand, when the SON server B determines that off-loading from the cell 30a to the cell 10a is still required after the SON server A has completed handover optimization, the SON server B performs this off-loading, whereby load on the cell 30a can be reduced.

As described above, according to the exemplary embodiments of the present invention, the problem such that optimization control does not converge or expected effects cannot be obtained because the SON servers A and B perform network optimization independently of each other, can be solved. As a result, optimization in the entire system can be achieved. Note that the notification or exchange of optimization information may be performed not only among radio stations and network operation management apparatuses (SON servers) within the same system but also among radio stations and network operation management apparatuses (SON servers) in different systems.

Incidentally, the reason why handover optimization has precedence over off-loading is that a handover failure is expected to more greatly affect a radio link failure or throughput degradation. However, this rule is only for the purpose of illustration rather than for limitation, and any rule will do as long as it is a predefined rule that can solve the problem that optimization control does not converge or expected effects cannot be obtained because network optimization is performed independently of each other.

5. Application Examples

Hereinafter, a description will be given of examples in which the above-described exemplary embodiments are applied to a 3GPP LTE (Long Term Evolution) radio communication system.

Figure 8:
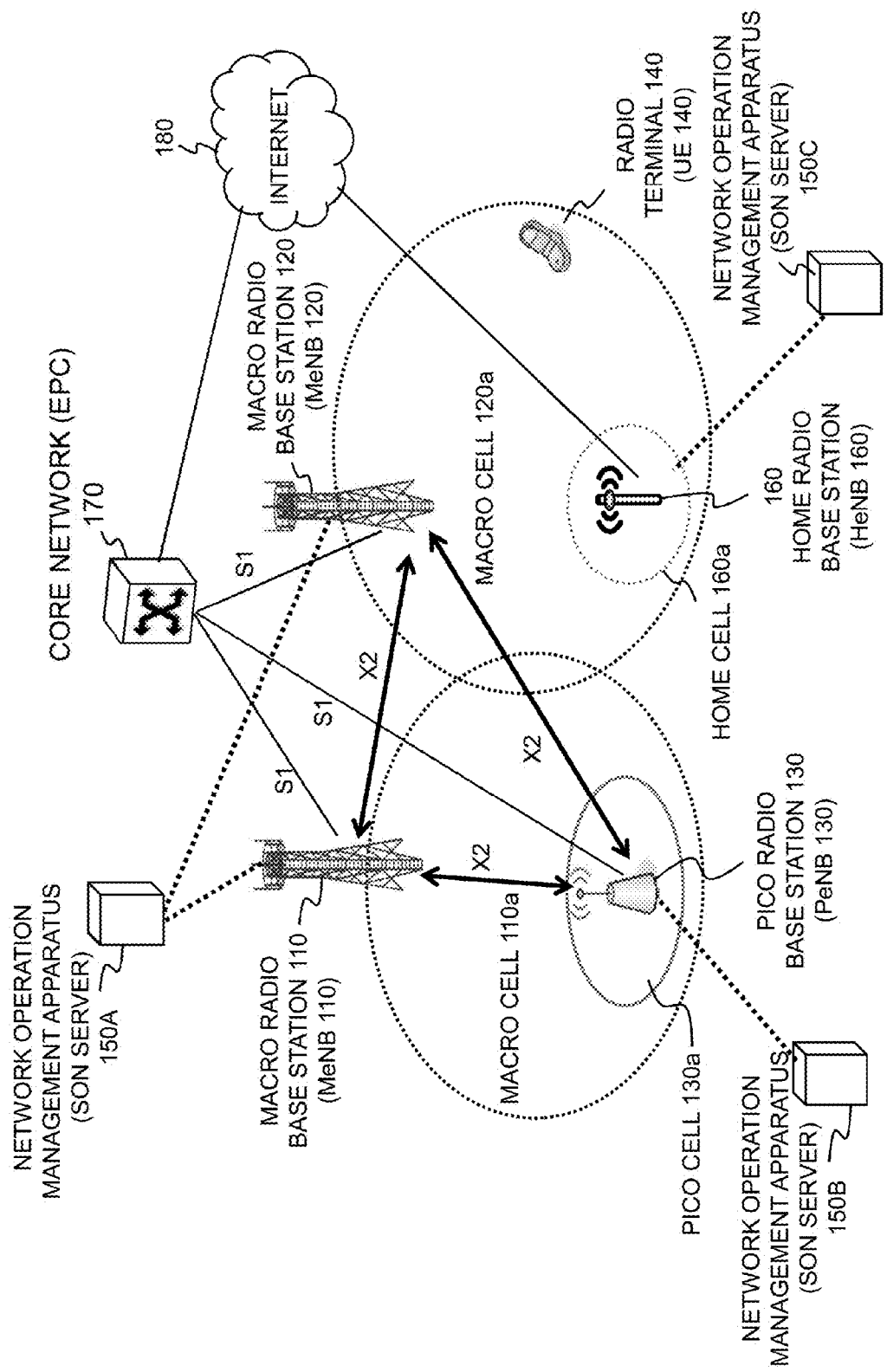
FIG. 8 is a system architecture diagram for describing an outline of a 3GPP LTE system, which is an example of the radio communication system according to the present invention.

Referring to FIG. 8, an LTE radio communication system includes, as an example: macro eNBs (MeNBs) 110 and 120; macro cells 110a and 120a managed by the MeNBs 110 and 120, respectively; a network operation management apparatus (also referred to as a SON server) 150A managing the MeNBs 110 and 120; a pico eNB (PeNB) 130; a pico cell 130a managed by the PeNB 130; and a network operation management apparatus (SON server) 150B managing the PeNB 130, and is assumed to further include: a home eNB (HeNB) 160; a home cell 160a managed by the HeNB 160; a network operation management apparatus (SON server) 150C managing the HeNB 160; a core network (Evolved Packet Core (EPC)) 170; and a user equipment (UE) 140. Here, the MeNBs 110 and 120 and the PeNB 130 are connected to each other through direct interfaces known as X2 and each are further connected to the core network (EPC) 170 through interfaces known as S1. Meanwhile, the HeNB 160 is connected to the core network (EPC) 170 via a broadband circuit and the Internet 180. Note that the home eNB (HeNB) 160 and the home cell 160a are also referred to as a femto eNB (FeNB) and a femto cell, respectively. Moreover, the core network (EPC) 170 includes, for example, a mobility management entity (MME), a serving gateway (S-GW) and the like as constituents.

As described earlier, the macro eNB (MeNB) 110 generates first optimization information regarding network optimization in the macro cell 110a and notifies the first optimization information to the macro eNB (MeNB) 120 and/or pico eNB (PeNB) 130 (first exemplary embodiment).

Alternatively, the MeNB 110 requests second optimization information regarding network optimization in the macro cell 120a and/or pico cell 130a from the MeNB 120 and/or PeNB 130, respectively, and the MeNB 120 and/or PeNB 130 notify the second optimization information to the MeNB 110 (second exemplary embodiment). Then, the MeNB 110 performs network optimization in the macro cell 110a based on the second optimization information. However, this request may be an on-demand request or may be a request for periodically reporting.

Alternatively, it is also possible that the MeNB 110 requests the MeNB 120 and/or PeNB 130 to notify second optimization information when being triggered by an event, and when (or after) the predetermined event occurs, the MeNB 120 and/or PeNB 130 notify the second optimization information (third exemplary embodiment). The predetermined event may be predefined, or may be notified (i.e., indicated) by the MeNB 110. Alternatively, the second optimization information may be periodically notified at predetermined intervals after the event occurs. Further, it is also possible that the MeNB 110 notifies the second optimization information and the like to the network operation management apparatus (SON server) 150A managing the MeNB 110, and the SON server 150A executes a network optimization algorithm based on this second optimization information and the like to determine radio parameter and/or network parameter and notify them to the MeNB 110, which then performs network optimization.

Here, for the notification of the first or second optimization information between the MeNBs 110 and 120 and the PeNB 130, the X2 interface may be used, or the S1 interface may be used. Further, means for notifying the first optimization information or second optimization information are not limited to X2 and S1. For example, it is also possible the MeNB 110 makes notification to the home eNB (HeNB) 160 via a broadband line and the EPC 170, or makes notification by using an interface (known as Iur-h) between different HeNBs (not shown). Further, in the present invention, it is also possible that the network operation management apparatuses (SON servers) are configured to generate the first optimization information and second optimization information, in which case the first and second optimization information may be notified by using, for example, an interface between the SON servers 150A and 150B. The MeNB 110 notifies the first optimization information or second optimization information through the X2 interface, whereby it is possible to enhance the effect of avoiding system performance degradation caused by network optimization.

Here, the first or second optimization information may be also configured to include information on the execution status of a "network optimization function", indicating "to be executed", "under execution" or "execution completed", and the like, as described above in 3.1) section.

Further, the first or second optimization information may be also configured to include any of: information related to type (function) of network optimization; information related to purpose of network optimization; information related to control policy in network optimization; radio parameter or network parameter to be targeted for optimization; execution time when network optimization was performed; scheduled execution time when network optimization will be performed; information indicating a timing of performing network optimization; interval of network optimization; location information of a radio station; and the like.

For "network optimization type", conceivable ones include, for example:
Coverage Optimization;
Capacity Optimization;
Coverage and Capacity Optimization (CCO);
Handover optimization (Mobility Robustness Optimization: MRO);
Load balancing optimization (Mobility Load Balancing: MLB);
Cell Outage Compensation (COC);
Energy Saving Management (ESM);
Random access optimization (Random Access channel Optimization: RAO);
Neighbour cell list optimization (Automatic Neighbour Relation: ANR);
Cell ID automatic configuration (Automated Configuration of Physical Cell Identity);
Inter-cell interference mitigation (Inter Cell Interference Reduction); and the like.
Here, CCO may be also used when only coverage or only capacity is optimized, that is, when coverage or capacity optimization is performed.

Conceivable ones for the network optimization purpose related information and for the network optimization control policy related information include, but are not limited to, those listed for b) and c), respectively, in 3.2) section described above. Note that when information related to network optimization purpose is about optimization of a handover to a neighbour cell, information indicating how handover optimization is performed may be notified. Conceivable information is, for example, information indicating which one of "too late handover", "too early handover" and "handover to wrong cell" is a purpose, as described in NPL 1.

Moreover, for the target radio or network parameter for optimization, conceivable ones include, for example:
transmit power of a radio station;
angle of antenna (tilt or azimuth) of a radio station;
number of antennas (number of antenna ports) actually transmitting/receiving signals at a radio station;
handover-related parameter;
cell (re-)selection-related parameter;
Neighbour Cell List (NCL);
common channel transmission parameter;
shared channel transmission parameter;
control channel transmission parameter;
cell on/off switching; and the like.

The transmit power of a radio station is, for example, transmit power for a common reference signal (CRS), physical downlink control channel (PDCCH), physical downlink shared channel (PDSCH), or the like.

The handover-related parameter is, for example, a parameter used for instruction for UE measurement information (UE Measurement Report) (e.g., a cell individual offset value such as CellIndividualOffset (CIO)), an event parameter used for determination of reporting UE measurement information (e.g., a threshold of received quality such as a1/a2/a4/a5-Threshold, an offset value such as a3-offset, a determination period such as Time To Trigger), or the like.

The cell (re-)selection-related parameter is, for example, cellReselectionInfoCommon, cellReselectionServingFreq-Info, intraFreqCellReselectionInfo, or the like.

The common channel transmission parameter is, for example, a transmission parameter such as a system information block (SIB) or paging channel (PCH).

The shared channel transmission parameter is, for example, a transmission parameter of a random access channel (RACH).

The control channel transmission parameter is, for example, a transmission parameter of a PDCCH, physical uplink control channel (PUCCH), or the like.

Here, in the LTE system, conceivable messages to communicate optimization information through the X2 interface include, but are not limited to, for example: messages for X2 interface establishment (X2 SETUP REQUEST, X2 SERTUP RESPONSE); messages for eNB configuration update (ENB CONFIGURAION UPDATE, ENB CONFIGURAION UPDATE ACKNOWLEDGE); messages for cell activation of a neighbour eNB (CELL ACTIVATION REQUEST, CELL ACTIVATION RESPONSE); a message for load indication (LOAD INFORMATION); messages regarding a mobility settings change (MOBILITY CHANGE REQUEST, MOBILITY CHANGE ACKNOWLEDGE); messages for resource status reporting initiation/resource status reporting (RESOURCE STATUS REQUEST, RESOURCE STATUS RESPONSE, RESOURCE STATUS UPDATE); and the like. It is needless to say that other messages may be newly defined.

Hereinafter, examples will be illustrated in which the present invention is applied to LTE.

5.1) First Example

According to a first example of the present invention, each eNB notifies optimization information (SON function information) to another eNB when executing a network self-optimization (SON) function.

Figure 9:
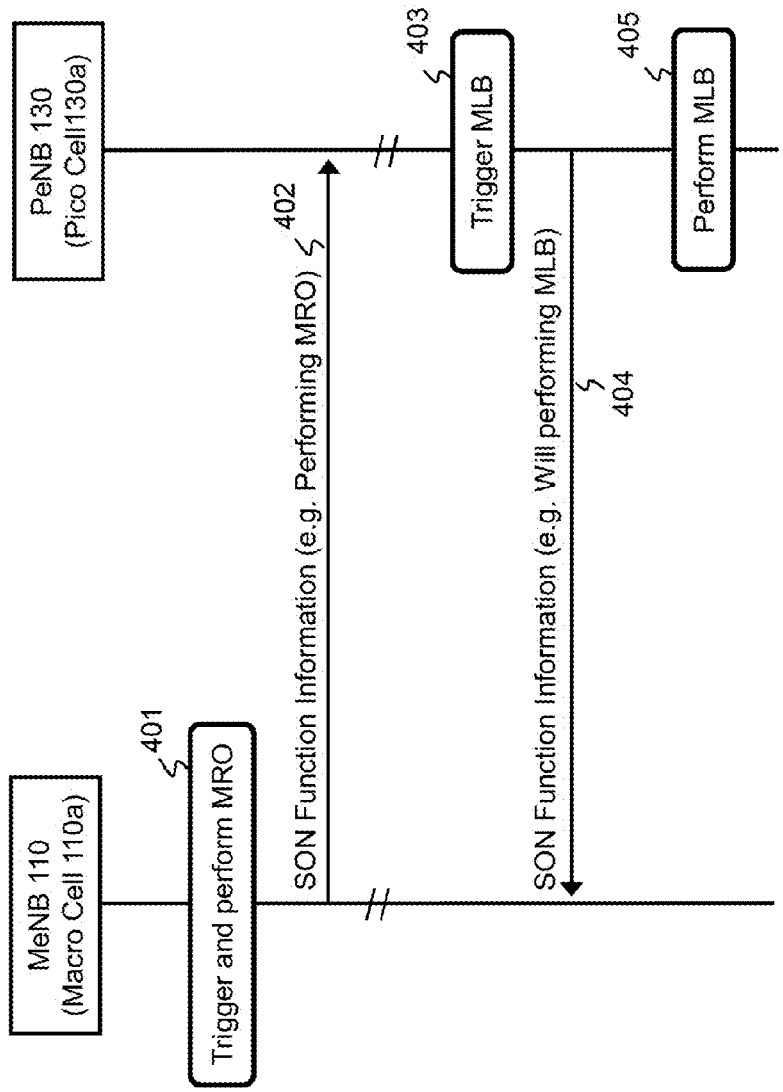
FIG. 9 is a sequence diagram showing an example of operations in a radio communication system according to a first example of the present invention.

Referring to FIG. 9, first, it is assumed that handover optimization (MRO), which is one of the SON functions, is triggered to be performed on the MeNB 110 side (Operation 401; Trigger and perform MRO). The MeNB 110 notifies the neighbour PeNB 130, as optimization information, that, for example, MRO is being performed (Operation 402; SON Function Information (e.g., performing MRO)). Note that it may be also notified, as further detailed information, that this MRO is being performed in the macro cell 110a, that the pico cell 130a is a target to which this MRO is applied (i.e., a handover-target cell), that CellInvidualOffset (CIO) as a handover-related parameter is being optimized, or the like. The PeNB 130 that has received this optimization information takes an appropriate action not to interfere the MRO processing by the MeNB 10. For example, a conceivable action is to refrain from performing MRO during a predetermined period of time, to refrain from executing a SON function, or the like.

Meanwhile on the PeNB 130 side, when load balancing optimization (MLB) is triggered in the pico cell 130a (Operation 403; Trigger MLB), it is notified to the neighbour MeNB 10, as optimization information, that, for example, MLB will be performed (Operation 404; SON Function Information (e.g., Will perform MLB)). Note that, as further detailed information, it may be also notified that the purpose is to offload to a neighbour cell, or a scheduled execution time for this MLB or the like may be notified. Then, for example, when it is the scheduled execution time, a handover-related parameter is updated and MLB is performed (Operation 405; Perform MLB). It is conceivable that the MeNB 110 that has received this optimization information may take an action such as, for example, refraining from performing MRO, MLB or all SON functions for a predetermined period of time. Alternatively, in the case where the PeNB 130 notifies a scheduled execution time for MLB, the PeNB 130 may be configured to reset and restart the collection of statistical communication quality (Key Performance Indicator: KPI) at this scheduled execution time, or may be configured to suspend optimization processing until this scheduled execution time and resume optimization processing at (or after) this scheduled execution time.

Through the above-described operations, each eNB or network operation management apparatus (SON server) appropriately performs optimization processing and the like in a cell under its management, with consideration given to what network optimization is being performed or will be performed by its neighbour eNB, and thereby can accomplish network optimization.

Note that although the present example illustrates that optimization information is notified between the MeNB 110 and the PeNB 130, the destination to which the MeNB 110 notifies optimization information (SON function information) is not limited to the PeNB 130, and similarly, the destination to which the PeNB 130 notifies optimization information (SON function information) is not limited to the MeNB 110. Moreover, information included in the optimization information (first optimization information) notified from the MeNB 110 to the PeNB 130 or in the optimization information (second optimization information) notified from the PeNB 130 to the MeNB 110 is not limited to those illustrated in the description of the present example, but may be any of all of the items of first and second optimization information mentioned earlier.

On the other hand, even if the MeNB 110 and PeNB 130 have not established an X2 interface connection, it is sufficient that optimization information is notified through the S1 interface with the core network (EPC) 170. Alternatively, it is also possible that optimization information is configured to be notified between the network operation management apparatus (SON server) 150A managing the MeNB 110 and the network operation management apparatus (SON server) 150B managing the PeNB 130.

Further, network optimization can be performed by an eNB itself, but this is not limitation. For example, it is also possible that a network operation management apparatus (SON server) is configured to execute an optimization algorithm and instruct an eNB performing optimization to update radio parameter and/or network parameter.

5.2) Second Example

According to a second example of the present invention, each eNB notifies optimization information (SON function information) to another eNB when executing a network self-optimization (SON) function, and notifies the completion of the execution when the optimization has been completed.

Figure 10:
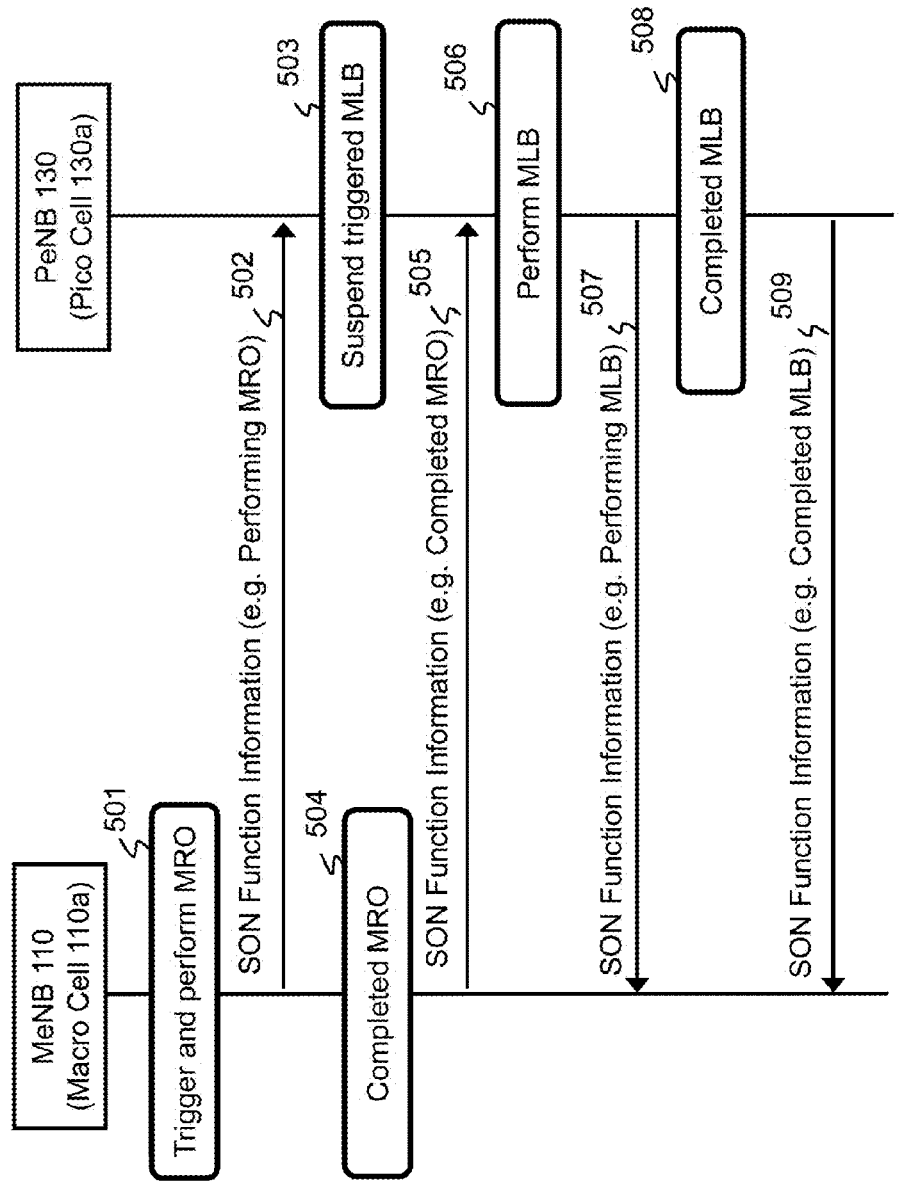
FIG. 10 is a sequence diagram showing an example of operations in a radio communication system according to a second example of the present invention.

Referring to FIG. 10, first, it is assumed that handover optimization (MRO), which is one of the SON functions, is triggered to be performed at the MeNB 110 (Operation 501; Trigger and perform MRO). The MeNB 110 notifies the neighbour PeNB 130, as optimization information, that, for example, MRO is being performed (Operation 502; SON Function Information (e.g., Performing MRO)). Meanwhile, when the PeNB 130 that has received this notification detects the necessity for load balancing optimization (MLB) in the pico cell 130*a*, the PeNB 130 temporarily suspends processing for load balancing (Operation 503; Suspend triggered MLB). The MeNB 110, when completing the MRO (Operation 504; completed MRO), notifies this completion of the execution to the PeNB 130 (Operation 505; SON Function Information (e.g., Completed MRO)). The PeNB 130, when receiving the notification of the completion of the execution, performs the suspended MLB (Operation 506; Perform MLB) and notifies the MeNB 110, as optimization information, that MLB is being performed (Operation 507; SON Function Information (e.g., Performing MLB)). Then, when completing the MLB (Operation 508; Completed MLB), the PeNB 130 notifies this completion of the execution to the MeNB 110 (Operation 509; SON Function Information (e.g., Completed MLB)).

Through the above-described operations, each eNB or network operation management apparatus (SON server) appropriately performs optimization and the like in a cell under its management, with consideration given to what network optimization is being performed, or has completed, by its neighbour eNB, and thereby can accomplish network optimization. According to the present example in particular, when each eNB knows that a cell of its own is a target of network optimization that is being performed by a neighbour eNB, the eNB avoids a problem occurring by waiting until the network optimization that is being performed by the neighbour eNB completes. That is, it is possible to avoid the problem that a performance of the entire system is degraded by eNBs performing mutually opposite processing, or that originally expected effects cannot be obtained due to counterparts' control, and the like.

Note that it is also possible in the present example that, for example, a network operation management apparatus (SON server) executes an optimization algorithm and instructs an eNB performing optimization to update radio parameter and/or network parameter, as in the first example.

5.3) Third Example

According to a third example of the present invention, an eNB requests optimization information (SON function information) from another eNB, and the eNB that has received this request reports optimization information. However, not all eNBs need to make such a request.

Figure 11:
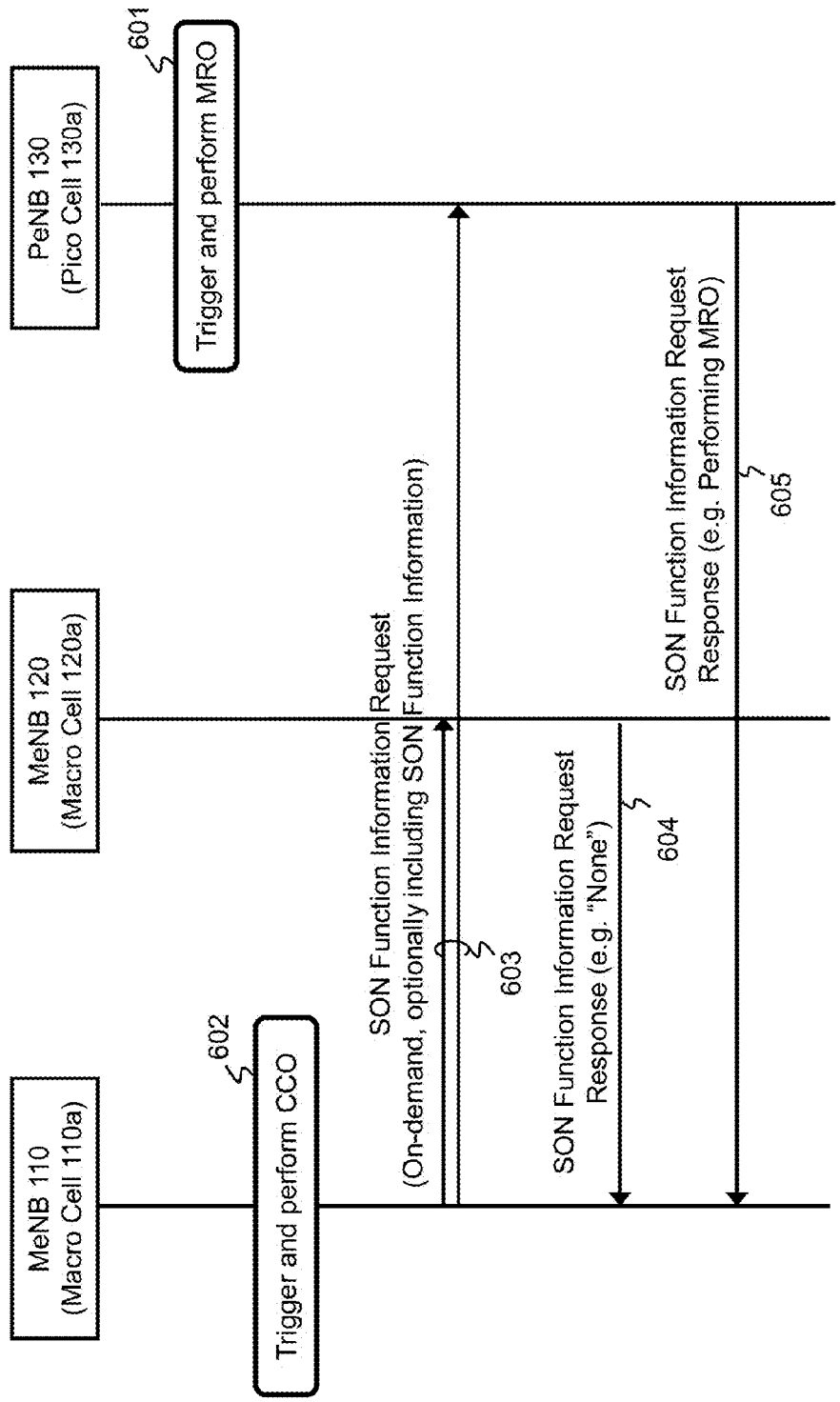
FIG. 11 is a sequence diagram showing an example of operations in a radio communication system according to a third example of the present invention.

Referring to FIG. 11, first, it is assumed that handover optimization (MRO), which is one of the SON functions, is triggered to be performed at the PeNB 130 and that the PeNB 130 is actually performing MRO (Operation 601; Trigger and perform MRO). At a certain point of time, it is assumed that coverage and (or) capacity optimization (CCO) is triggered to be performed at the MeNB 110 (Operation 602; Trigger and perform CCO). At this time, the MeNB 110 requests the neighbour MeNB 120 and PeNB 130 to make an on-demand report of optimization information (Operation 603; SON Function Information Request (On-demand)). Note that this request message may be configured to include optimization information on its own (MeNB 110) (Optionally including SON Function Information), or optimization information may be notified as a separate message. Further, it may be also notified, as further detailed information, that this CCO is being performed in the macro cell 110*a*, that the coverage is being extended, that the transmit power of a reference signal, as a radio parameter being optimized, is being adjusted (e.g., the transmit power is being increased), that the antenna tilt angle, as a network parameter being optimized, is being adjusted (e.g., uptilting), or the like. In response to this, the MeNB 120, as it is not performing network optimization, makes no report, or reports information indicating that it is not performing network optimization (Operation 604; SON Function Information Request Response (e.g., "None")). Note that the information indicating that network optimization is not being performed may be notified by using a flag, or may be notified by using any other method. On the other hand, the PeNB 130, as it is performing MRO in the pico cell 130*a*, reports to the MeNB 110 that it is performing MRO (Operation 605; SON Function Information Request Response (e.g., Performing MRO)). In this event, this message reported from the PeNB 130 to the MeNB 110 may be optimization information (SON function information) or may be information in a form different from optimization information.

When thus receiving a response (e.g., notification of optimization information) from a neighbour eNB (e.g., the PeNB 130), it is conceivable that the MeNB 110 may take an action such as waiting for a predetermined period of time until the PeNB 130 completes the execution of MRO and then performing CCO in the macro cell 110*a*, or performing CCO in the macro cell 110*a* in a conservative manner (i.e., modestly without making a great change). Oppositely, it is also possible that when the PeNB 130 is notified from the MeNB 110 that the MeNB 110 is performing CCO, the PeNB 130 suspends MRO in the pico cell 130*a* for a predetermined period of time.

Through the above-described operations, each eNB or network operation management apparatus (SON server) appropriately performs optimization and the like in a cell under its management, with consideration given to what network optimization is being performed or will be performed by its neighbour eNB, and thereby can accomplish network optimization.

Note that information included in the optimization information (first optimization information) notified from the MeNB 110 to the PeNB 130 or in the optimization information (second optimization information) notified from the PeNB 130 to the MeNB 110 is not limited to those illustrated in the description of the present example, but may be any of all of the items of first and second optimization information mentioned earlier.

Moreover, even if the MeNBs 110 and 120 and PeNB 130 have not established X2 interface connections, it is sufficient that optimization information is notified through the S1 interface with the core network (EPC) 170. Alternatively, it is also possible that optimization information is configured to be notified between the network operation management apparatus (SON server) 150A managing the MeNB 110 and the network operation management apparatus (SON server) 150B managing the PeNB 130.

Note that it is also possible in the present example that a network operation management apparatus (SON server) executes an optimization algorithm and instructs an eNB performing optimization to update radio parameter and/or network parameter, as in the first example.

5.4) Fourth Example

According to a fourth example of the present invention, an eNB requests optimization information (SON function information) from another eNB, and the eNB that has received this request reports optimization information when a predetermined condition is met (here, when a predetermined event occurs) at the own station. Note that a predetermined event in the present example is assumed to mean that network optimization is triggered by something.

Figure 12:
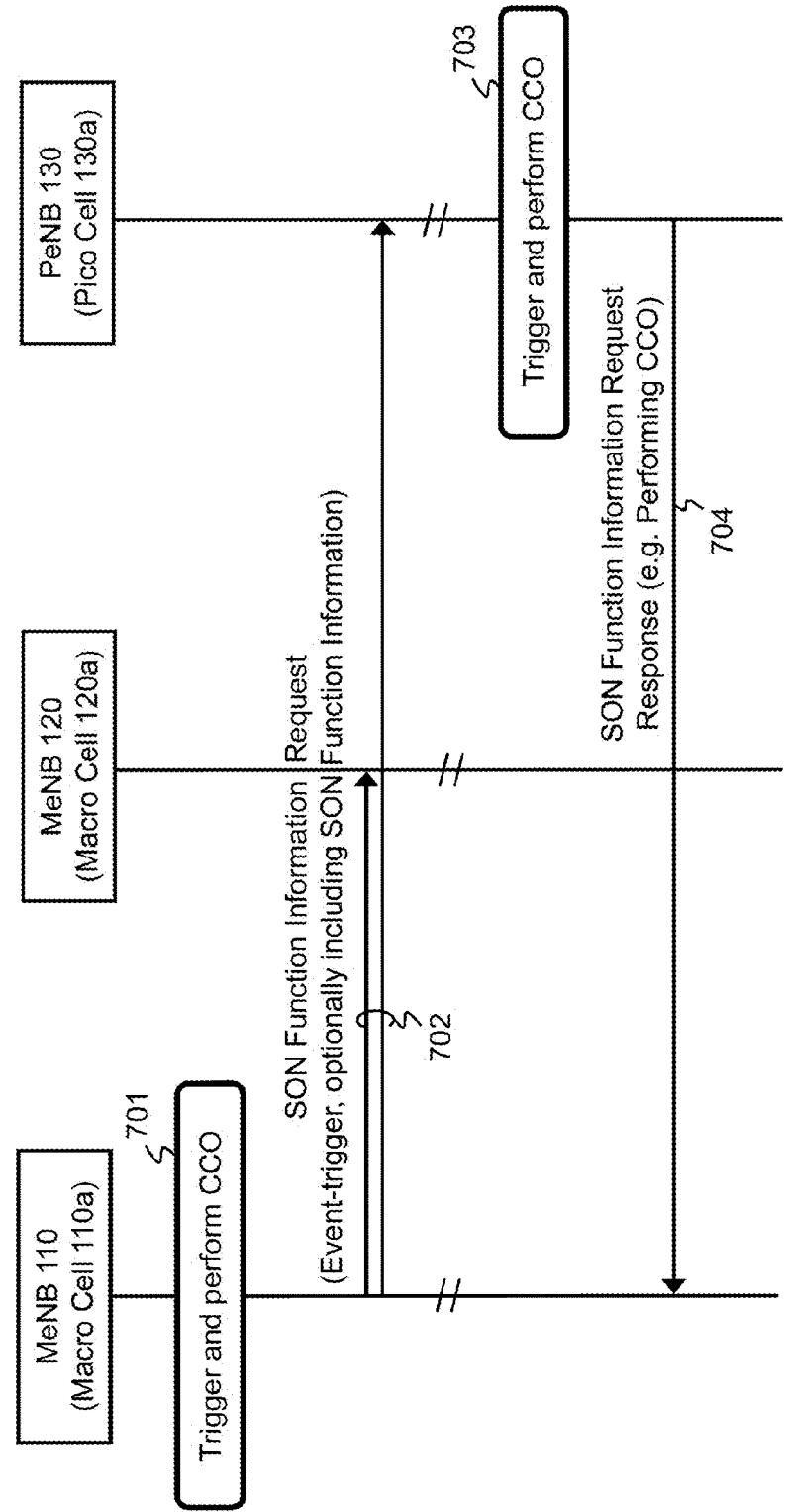
FIG. 12 is a sequence diagram showing an example of operations in a radio communication system according to a fourth example of the present invention.

Referring to FIG. 12, it is assumed that coverage and (or) capacity optimization (CCO) is triggered to be performed in the MeNB 110 at a certain point of time (Operation 701; Trigger and perform CCO). At this time, the MeNB 110 requests the neighbour MeNB 120 and PeNB 130 to make an event-triggered (i.e., triggered when a predetermined event occurs) report of optimization information (Operation 702; SON Function Information Request (Event-trigger)). Note that this request message may be configured to include optimization information on its own (MeNB 110) (Optionally including SON Function Information), or optimization information may be notified as a separate message. Further, it may be also notified, as further detailed information, for example, that this CCO is being performed in the macro cell 110*a*, that the coverage is being reduced, that the transmit power of a reference signal, as a radio parameter being optimized, is being adjusted (e.g., the transmit power is being decreased), that the antenna tilt angle, as a network parameter being optimized, is being adjusted (e.g., downtilting), or the like.

Here, it is assumed that coverage and (or) capacity optimization (CCO) is triggered in the PeNB 130 at another certain point of time (Operation 703). Since the predetermined event (i.e., a trigger of network optimization) has occurred, the PeNB 130 reports optimization information to the MeNB 110 (Operation 704; SON Function Information (e.g., Performing CCO)). Further, it may be also notified, as optimization information, for example, that this CCO is being performed in the pico cell 130*a*, that the coverage is being extended, or the like. Note that the message used for this report may be SON Function Information Request Response in the second example. The PeNB 130 then performs CCO in the pico cell 130*a*, with consideration given to the CCO by the MeNB 110.

Through the above-described operations, each eNB or network operation management apparatus (SON server) appropriately performs optimization and the like in a cell under its management, with consideration given to what network optimization is being performed or will be performed by its neighbour eNB, and thereby can accomplish network optimization.

Note that information included in the optimization information (first optimization information) notified from the MeNB 110 to the MeNB 120 and PeNB 130 or in the optimization information (second optimization information) notified from the PeNB 130 to the MeNB 110 is not limited to those illustrated in the description of the present example, but may be any of all of the items of first and second optimization information mentioned earlier.

Moreover, even if the MeNBs 110 and 120 and PeNB 130 have not established X2 interface connections, it is sufficient that optimization information is notified through the S1 interface with the core network (EPC) 170. Alternatively, it is also possible that optimization information is notified between the network operation management apparatus (SON server) 150A managing the MeNB 110 and the network operation management apparatus (SON server) 150B managing the PeNB 130.

Note that it is also possible in the present example that a network operation management apparatus (SON server) executes an optimization algorithm and instructs an eNB performing optimization to update radio parameter and/or network parameter, as in the first example.

5.5) Other Examples

Although each of the above-described examples is described assuming an LTE radio communication system as shown in FIG. 8, the present invention can be also applied to home radio base stations (home eNBs (HeNBs), or also referred to as femto eNBs (FeNBs)) in LTE. In this case, the X2 interface between HeNBs, the S1 interface between an HeNB and an HeNB gateway (HeNB GW), and the like are used in place of the X2 interface between eNBs and the S1 interface between an eNB and a core network (EPC). In addition, it is also possible to utilize an RIM (RAN Information Management) process.

Further, the present invention can be also applied to 3GPP UMTS (Universal Mobile Telecommunication System). In the case of UMTS, the Iub interface between a radio base station (NB) and a radio network controller (RNC), the Iu interface between an RNC and a core network (CN), the Iur interface between RNCs, the Iur-h interface between home radio base stations (HNBs), the Iuh interface between an HNB and an HNB gateway (HNB GW), and the like are used in place of the X2 and S1 interfaces of LTE.

Furthermore, the present invention can be also applied to 3GPP2 CDMA (Code Division Multiple Access) 2000 (e.g., CDMA 1×EV-DO (Evolution Data Only), 1×RTT (Single-Carrier Radio Transmission Technology), HRPD (High Rate Packet Data)) and to GSM (Global System for Mobile communication). In the case of CDMA2000, the S101/S102 interface, which are interfaces between an LTE core network (EPC) and a CDMA 1× core network, and the like may be used, or a direct interface between an LTE eNB and a CDMA BSC (Base Station Controller) may be established and used, in place of the X2 and S1 interfaces of LTE. In the case of GSM, the Iur-g interface is used. Moreover, the present invention can be also applied to WiMAX (Worldwide interoperability for Microwave Access) and the like.

INDUSTRIAL APPLICABILITY

The present invention is applicable to radio communication systems with SON functionality, such as, for example, 3GPP LTE, 3GPP UMTS, 3GPP2 CDMA2000, GSM, and WiMAX systems.

REFERENCE SIGNS LIST

10, 20, 30, 60 Radio station/radio base station
10*a*, 20*a*, 30*a*, 60*a* Cell
11 Radio receiver
12 Demodulation section
13 Transmission section
14 Reception section
15 Control section
16 Signal generation section
17 Radio transmitter
18 Optimization section
50 Network operation management apparatus (SON server)
51 Reception section
52 Network supervision section
53 Optimization control section
54 Transmission section

The invention claimed is:
1. A radio communication system, comprising:
a first radio base station;
second radio base stations;
a first Self Organizing Network (SON) server that manages the first radio base station and does not manage the second radio base stations; and
a second SON server that manages the second radio base stations and does not manage the first radio base station, wherein the first radio base station comprises a memory storing instructions and a processor configured to execute the instructions to:
  receive second network optimization information of second network optimization in a second cell of at least one of the second radio base stations from at least one of the second radio base stations or the second SON server, the second network optimization being performed by at least one of the second radio base stations or the second SON server, and
  perform first network optimization in a first cell of the first radio base station with consideration of the second network optimization in the second cell by utilizing the received second network optimization information,
wherein the second network optimization information includes:
  information indicating a type of network optimization, and
  at least one of information related to a control policy in network optimization or information related to execution timing of network optimization,
    wherein the control policy in network optimization includes at least one of a time condition for control, a priority of each type of network optimization, or an optimization mode, and
    wherein the information related to execution timing of network optimization includes at least one of information indicating a timing of performing network optimization or an interval of network optimization.

2. The radio communication system according to claim 1, wherein at least one of the second radio base stations or the second SON server requests the first radio base station to notify first network optimization information regarding the first network optimization in the first cell, and the first radio base station, in response to this request for notification, notifies the first network optimization information to at least one of the second radio base station or the second SON server.

3. The radio communication system according to claim 1, wherein the type of network optimization is at least one of coverage optimization, capacity optimization, coverage and capacity optimization, handover optimization, load balancing optimization, cell outage compensation, energy saving management, random access optimization, neighbor cell list optimization, automated configuration of cell identify, or inter-cell interference reduction.

4. The radio communication system according to claim 1, wherein the second network optimization information includes information related to an execution status of the second network optimization in the second cell of at least one of the second radio base stations.

5. The radio communication system according to claim 1, wherein a purpose of network optimization is at least one of handover optimization for a specific neighbor cell, handover optimization for multiple neighbor cells, off-loading to a neighbor cell, off-loading from a neighbor cell, coverage maximization, coverage extension, coverage shrink, dead spot elimination, inter-cell interference coordination, or fractional frequency reuse.

6. The radio communication system according to claim 1, wherein the second network optimization information includes information related to control policy in the second network optimization.

7. The radio communication system according to claim 6, wherein the information related to control policy in the second network optimization includes at least one of optimization at long intervals, optimization at short intervals, or optimization triggered by a predetermined condition being met.

8. The radio communication system according to claim 6, wherein the information related to control policy in the second network optimization includes at least one of an order of priorities among multiple types of network optimization, a priority or a degree of importance of each type of network optimization, or an optimization mode.

9. The radio communication system according to claim 1, wherein the second network optimization information includes information related to execution timing of the second network optimization.

10. The radio communication system according to claim 9, wherein the information related to execution timing of the second network optimization includes at least one of an execution time when the second network optimization was performed, a scheduled execution time when the second network optimization will be performed, information indicating a timing of performing the second network optimization, or an interval of the second network optimization.

11. The radio communication system according to claim 1, wherein the second network optimization information includes at least one of a radio parameter or a network parameter to be targeted for optimization.

12. The radio communication system according to claim 1, wherein the first and second radio base stations are managed by different SON servers, wherein the second network optimization information is communicated between these different SON servers.

13. The radio communication system according to claim 1, wherein the processor is further configured to execute the instructions to notify first network optimization information regarding the first network optimization in the first cell, to both the second radio base station and to the second SON server.

14. A first radio base station managed by a first Self Organizing Network (SON) server, the first radio base station comprising:
  a memory storing instructions and a processor configured to execute the instructions to:
    receive, from at least one of second radio base stations managed by a second SON server, second network optimization information of second network optimization in a second cell of at least one of the second radio base stations, the second network optimization being performed by at least one of the second radio base stations and the second SON server; and
    perform first network optimization in a first cell of the first radio base station with consideration of the second network optimization in the second cell by utilizing the received second network optimization information,
  wherein the first radio base station is not managed by the second SON server, and the second radio base stations are not managed by the first SON server, and
  wherein the second network optimization information includes:
    information indicating a type of network optimization, and
    at least one of information related to a control policy in network optimization or information related to execution timing of network optimization,
      wherein the control policy in network optimization includes at least one of a time condition for control, a priority of each type of network optimization, or an optimization mode, and
wherein the information related to execution timing of network optimization includes at least one of information indicating a timing of performing network optimization or an interval of network optimization.

15. The first radio base station according to claim 14, wherein:
when a request to notify first network optimization information regarding network optimization in the first cell of the first radio base station is received from any one of the second radio base station, the first SON server, or the second SON server, and
the processor is further configured to execute the instructions to:
notify, in response to the request for notification, the first optimization information to an originator of the request for notification.

16. The first radio base station according to claim 14, wherein the type of network optimization is at least one of coverage optimization, capacity optimization, coverage and capacity optimization, handover optimization, load balancing optimization, cell outage compensation, energy saving management, random access optimization, neighbor cell list optimization, automated configuration of cell identify, or inter-cell interference reduction.

17. The first radio base station according to claim 14, wherein the second network optimization information includes information related to an execution status of network optimization in the second cell of the second radio base station.

18. The first radio base station according to claim 14, wherein a purpose of network optimization is at least one of handover optimization for a specific neighbor cell, handover optimization for multiple neighbor cells, off-loading to a neighbor cell, off-loading from a neighbor cell, coverage maximization, coverage extension, coverage shrink, dead spot elimination, inter-cell interference coordination, or fractional frequency reuse.

19. The first radio base station according to claim 14, wherein the second network optimization information includes information related to control policy in the second network optimization.

20. The first radio base station according to claim 14, wherein the second network optimization information includes information related to execution timing of the second network optimization.

21. The first radio base station according to claim 14, wherein the second network optimization information includes at least one of a radio parameter or a network parameter to be targeted for optimization.

22. The first radio base station according to claim 14, wherein the processor is further configured to execute the instructions to notify the first network optimization information to at least one of the second radio base stations or the second SON server.

23. A network optimization method in a radio communication system that includes first and second radio base stations and first and second Self Organizing Network (SON) servers, wherein the first SON server manages the first radio base station and does not manage the second radio base station, wherein the second SON server manages the second radio base station and does not manage the first radio base station, the method comprising:
receiving, by the first radio base station, second network optimization information of second network optimization in a second cell of the second radio base station from at least one of second radio base stations, the first SON server, or the second SON, wherein the second network optimization is performed by at least one of the second radio base stations and the second SON server; and
performing, by the first radio base station, first network optimization in a first cell of the first radio base station with consideration of the second network optimization in the second cell by utilizing the received second network optimization information,
wherein the second network optimization information includes:
information indicating a type of network optimization, and
at least one of information related to a control policy in network optimization or information related to execution timing of network optimization,
wherein the control policy in network optimization includes at least one of a time condition for control, a priority of each type of network optimization, or an optimization mode, and
wherein the information related to execution timing of network optimization includes at least one of information indicating a timing of performing network optimization or an interval of network optimization.

24. The network optimization method according to claim 23, further comprising notifying the first network optimization information to at least one of the second radio base stations, the first SON server, or the second SON server.

* * * * *